United States Patent [19]

Ehrfeld et al.

[11] Patent Number: 4,738,010

[45] Date of Patent: Apr. 19, 1988

[54] METHOD OF PRODUCING A SHEET OR PLATE-SHAPED STRUCTURE AS THE BEARING MATERIAL FOR SLIDE BEARINGS

[75] Inventors: Wolfgang Ehrfeld, Karlsruhe; Peter Hagmann, Leopoldshafen-Eggenstein; Werner Schelb, Pfinztal, all of Fed. Rep. of Germany

[73] Assignee: Kernforschungszentrum Karlsruhe GmbH, Karlsruhe, Fed. Rep. of Germany

[21] Appl. No.: 17,211

[22] Filed: Feb. 20, 1987

[30] Foreign Application Priority Data

Feb. 22, 1986 [DE] Fed. Rep. of Germany ....... 3605781

[51] Int. Cl.$^4$ ............................................. B21D 53/10
[52] U.S. Cl. ............................. 29/149.5 R; 29/527.2; 29/530; 29/557; 29/DIG. 16; 29/DIG. 25; 29/DIG. 29; 29/DIG. 48
[58] Field of Search ..................... 29/149.5 R, 149.5 S, 29/149.5 NM, 458, 527.1, 527.2, 527.3, 530, 557, 558, DIG. 16, DIG. 25, DIG. 29, DIG. 48; 348/129, 276, 297, 313; 264/219, 220, 239, 299

[56] References Cited

U.S. PATENT DOCUMENTS

| | | | |
|---|---|---|---|
| 2,498,873 | 2/1950 | Blue | 29/149.5 PM X |
| 2,781,549 | 2/1957 | Milne | 29/149.5 NM X |
| 4,208,472 | 6/1980 | Cho et al. | 29/149.5 NM X |
| 4,528,079 | 7/1985 | Badger | 29/149.5 NM X |
| 4,658,500 | 4/1987 | Engel et al. | 29/149.5 S X |

FOREIGN PATENT DOCUMENTS

| | | |
|---|---|---|
| 2234438 | 1/1974 | Fed. Rep. of Germany . |
| 1060501 | 4/1954 | France ..................... 29/149.5 NM |
| 145117 | 6/1920 | United Kingdom ....... 29/149.5 NM |
| 536414 | 5/1941 | United Kingdom ........... 29/149.5 R |

OTHER PUBLICATIONS

Becker, E. W. et al.; "Herstellung von Mikrostrukturen mit grossem Aspektverhältnis und grosser Strukturhöhe durch Röntgentiefenlithographie mit Synchrotronstrahlung, Galvanoformung und Kunststoffabformung (LIGA-Verfahren)"; KfK 3995; Institut für Kernverfahrenstechnik, Kernforschungszentrum Karlsruhe GmbH, (Nov. 1985).

Permaglide (Gleitlager), Klaus Schmidt, GmbH (Mar. 1983).

"Feststoffe zur Verminderung von Reibung und Verschleiss"; Haus der Technik-Vortragsveroffentlichungen; Vulkan-Verlag, Dr. W. Classen-Essen, vol. 269, (Feb. 15, 1971); pp. 61-67.

*Primary Examiner*—Howard N. Goldberg
*Assistant Examiner*—Ronald S. Wallace
*Attorney, Agent, or Firm*—Spencer & Frank

[57] ABSTRACT

A method of producing a plate-shaped bearing member for sliding bearings, the structure being composed of a patterned body of supporting bearing material and a lubricant, utilizing a galvanoplastic fabrication step, the method including: producing a mold provided with a pattern of recesses, the step of producing including performing an X-ray deep-etch lithography procedure; filling the recesses to form the body of bearing material; removing the mold from the body of bearing material so that spaces are left in the bearing material; and filling the thus produced spaces with the lubricant.

7 Claims, 6 Drawing Sheets

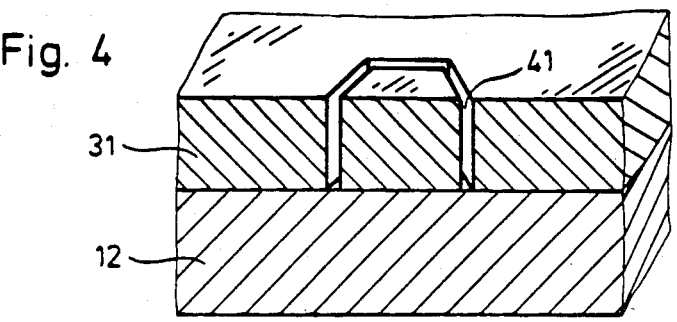
Fig. 4
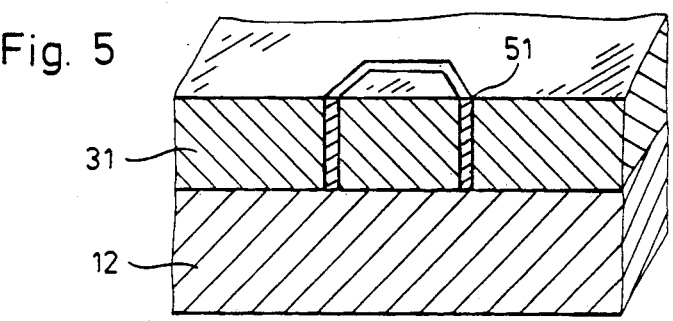
Fig. 5
Fig. 6
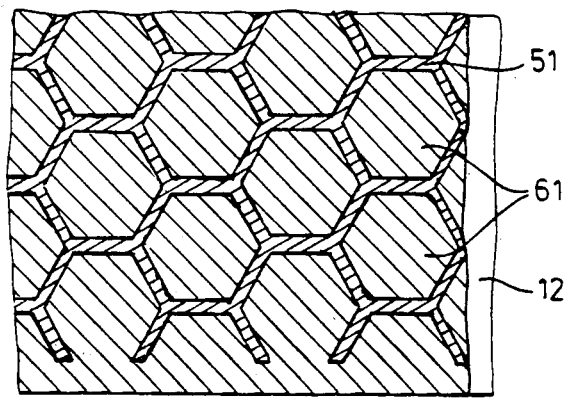

METHOD OF PRODUCING A SHEET OR PLATE-SHAPED STRUCTURE AS THE BEARING MATERIAL FOR SLIDE BEARINGS

BACKGROUND OF THE INVENTION

The present invention relates to a method of producing a sheet or plate-shaped structure as the bearing material for slide bearings.

German Pat. No. 683,764 discloses the production of bimetal bearing shells by galvanically, or electrolytically, depositing a layer of the bearing metal or of the bearing alloy on a hard metal substrate. However, such bearings are not structured and therefore have no self-lubricating properties.

For the production of self-lubricating slide bearings, it is known to apply a layer of a bearing material, e.g. bronze, in sintered form onto a substrate constituted, for example, by a steel foil or plate. Into this sintered and thus porous material, a lubricant is rolled, e.g. in the form of a mixture of polytetrafluoroethylene (PTFE) and lead (see product brochure entitled Permaglide ® Gleitlager, by Karl Schmidt GmbH, Neckarsulm (March, 1983). However, the ratio of supporting material surface area to lubricant discharging surface area is here substantially given by the selection of the material and the sintering process and can therefore be varied only within narrow limits. Moreover, as a result of the specific manufacturing process, the different size material surface regions and the different size lubricant emitting surface regions are distributed somewhat at random. As a consequence, no optimum conditions exist in the partial regions either for lubrication or for supporting capability.

The publication entitled "Haus der Technik-Vortragsver-öffentlichungen" [Published Lectures From The House Of Technology], No. 269 (1971) published by Vulkan Verlag Dr. W. Classen, Essen, pages 61-67, discloses a bearing bush made of a cast copper alloy in which a solid lubricant disposed in pockets or other recesses in the bearing face takes over the lubricating task. According to U.S. Pat. No. 3,938,868, ceramic materials may also be used as bearing material.

FRG-OS No. 2,234,428, and counterpart U.S. Pat. No. 3,976,342, disclose the insertion of a perforated intermediate layer of metal, plastic or a self-lubricating material between faces moving relative to one another and filling the cavities with lubricant. The faces themselves may also be provided with fine recesses in that the surface is given a profile by mechanical, chemical, electrochemical or electrical treatment methods, with such a profile then being rolled over, machined over or ground over. In this way, it is possible to produce structures in a pattern of, for example, circular or cross-shaped recesses, with the minimum distance between edges and the width of the bars being about 0.1 mm and 0.2 mm, respectively. This publication further mentions that it is important to place the cavities or recesses close to one another. However, with the above treatment methods it is not possible to fabricate structures having even smaller distances between edges and smaller bar widths, respectively, under consideration of the required structural depth.

SUMMARY OF THE INVENTION

It is an object of the present invention to provide a method for producing a structured sheet or plate-shaped structure having a freely selectable pattern as the bearing material for slide bearings, wherein the minimum characteristic lateral dimensions of the supporting structures and of the structures discharging lubricant lie in the micron range and have a structural depth up to several $100\mu$.

The above and other objects are achieved, according to the invention, by a method of producing a plate-shaped bearing member for slide bearings, the structure being composed of a patterned body of supporting bearing material and a lubricant, utilizing a galvanoplastic fabrication step, the method comprising:

(a) producing a mold provided with a pattern of recesses, the step of producing including performing an X-ray deep-etch lithography procedure;

(b) filling the recesses to form the body of bearing material;

(c) removing the mold from the body of bearing material so that spaces are left in the bearing material; and (d) filling the thus produced spaces with the lubricant.

The solution according to the present invention makes it possible to apply metal bars as well as metal pins with lubricant inserted therebetween on the metal substrate, with the wall thickness of the metal bars and the gap width of the lubricant discharging channels being a few microns at a height of several $100\mu$. Due to the manner in which the pattern is produced, the ratio of supporting surface area to lubricant discharging surface area can be positively defined even after wear. If the lubricant filled channels have parallel walls, the ratio remains constant; if the walls are conical relative to one another, this ratio changes with wear in a defined manner.

According to one preferred embodiment, the mold recesses have a bottom forming an electrically conductive layer, and the step of filling the recesses is carried out electrolytically using the electrically conductive layer as an electrode. Preferably, after the step of removing and before the step of filling the lubricant, the layer of bearing material is connected with a substrate body.

According to one variation of this embodiment, the said step of producing a mold is carried out to form a mold structure composed of at least one base portion having a selected height and selected transverse dimensions and at least one further portion protruding from the base portion and having a selected height and selected transverse dimensions, with at least one transverse dimension of the further portion being less than the corresponding transverse dimension of the base portion, and with the total height of the mold structure being at least equal to the thickness of the resulting bearing material layer.

According to a second preferred embodiment, the material used to fill the recesses in the step of filling is a non-electrolytically depositable, moldable material, preferably a plastic, glass, or ceramic material.

This procedure makes it possible to use, instead of an electrolytically deposited metal, another bearing material for the supporting bearing surface.

The production of microstructures by way of X-ray deep-etch lithography or by the molding technique derived therefrom (LIGA method) is described and illustrated in the report KFK 3995, (November, 1985), published by Kernforschungszentrum Karlsruhe, which is hereby incorporated by reference.

BRIEF DESCRIPTION OF THE DRAWING

Embodiments of the invention will be described below with reference to the drawing figures.

FIGS. 1 to 5 are perspective views of successive stages in the production of a bearing material in which the supporting bearing surface is formed of metal pins produced according to the LIGA method which are connected with one another in the manner of a network and are surrounded by channels that are filled with a lubricant.

FIG. 6 is a cross-sectional plan view of the completed structure.

DESCRIPTION OF THE PREFERRED EMBODIMENTS

Figure 1:
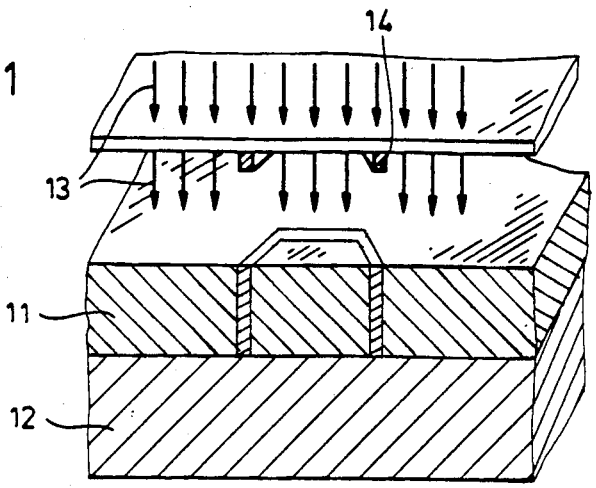
Figure 2:
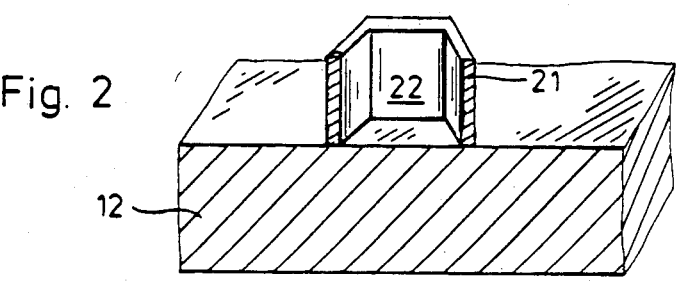
Figure 3:
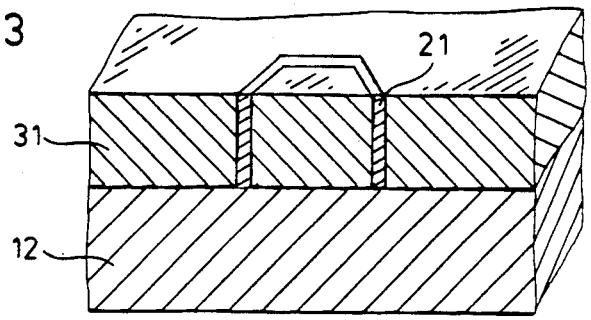

FIG. 1 shows a metal layer 12 on which has been applied a layer 11 of a material whose characteristics can be changed by X-ray radiation (resist material). By partially irradiating the material with synchrotron radiation 13 through an X-ray mask 14 followed by partial removal of the resist material utilizing the different material characteristics produced by the radiation, a negative mold 21 is produced which, as shown in FIG. 2, has a pattern of recesses 22 complementary to the X-ray mask absorber structure 14. The depth of recesses 22 corresponds to the thickness of negative mold 21. Then, by using metal layer 12 as the electrode, recesses 22 are electrolytically filled with a metal layer 31, as shown in FIG. 3. After metal layer 31 is given a flat upper surface, the remaining plastic of negative mold 21 is removed, to produce the structure of FIG. 4, and the resulting spaces 41 are filled with a lubricant 51, as shown in FIG. 5.

FIG. 6 is a plan view of the bearing material according to the invention for a slide bearing composed of metal layer 12 as the substrate material, metal pins 61 for the supporting bearing surface and a network of interconnected channels containing lubricant 51 surrounding the pins. Due to the solid metal pins, which account for a large proportion of the total surface area, this bearing material has a high supporting capability and is a good heat conductor. The supply of lubricant is distributed over the surface of the bearing uniformly according to the given pattern, with this distribution and thus the good sliding characteristics remaining unchanged even upon the occurrence of wear.

Figure 7:
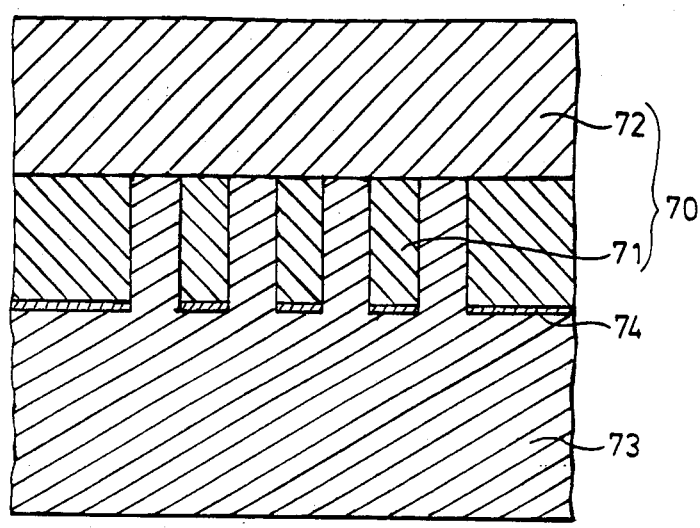
FIGS. 7 and 8 are cross-sectional elevational views of successive stages in the production of an embodiment in which a sheet-like structure is produced according to the electrolytic molding technique and is then connected with a metal substrate material and is filled with lubricant.

FIG. 7 is a sectional view of a molding tool 70 produced by X-ray deep-etch lithography and galvanoplasty. The tool is composed of microstructures 71 and a base plate 72 which is fixed to these microstructures and is in engagement with a molding substance 73. The frontal faces of microstructures 71 have previously been coated with an easily removable electrically conductive material 74. A casting resin (e.g., Plexit M60 made by Rohm, Darmstadt) to which 1 volume percent of a phlegmatized, 50 percent benzoyl peroxide has been added is preferably used as molding substance 73. To facilitate unmolding, an internal release agent (e.g., type PAT 665 made by Würtz GmbH, Bingen-Sponsheim) is added to the casting resin in a quantity of 4 volume percent.

Figure 8:
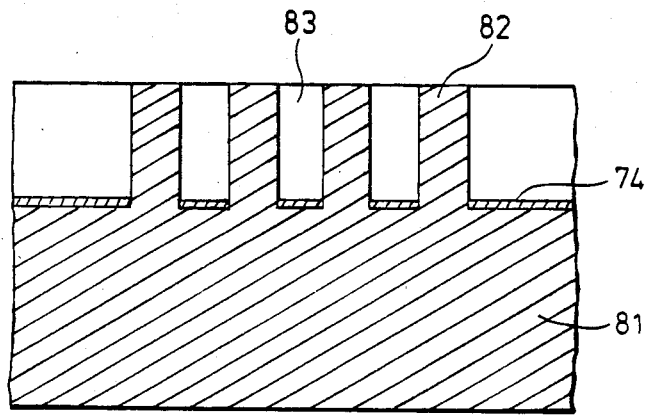

After thermosetting of molding substance 73, during which the electrically conductive material 74 forms a firm bond with the hardening molding substance 73, the thus produced negative molds composed, as shown in FIG. 8, of a basic body 81 having pin-shaped structures 82 surrounded by a network of recesses 83 is unmolded. The electrically conductive material 74, which serves as the electrode for electrolytically filling recesses 83 with bronze is disposed at the bottom of the recesses.

Figure 9:
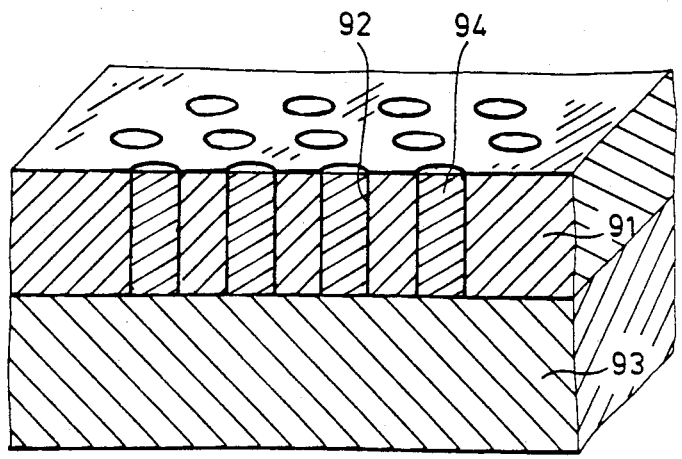
FIG. 9 is a perspective view of the completed structure.

After removal of negative mold 81, 82 and electrically conductive material 74 from the deposited material, sheet-like, or foil, structure 91 of metal remains which has circular perforations 92, as shown in FIG. 9. The sheet-like structure 91 is connected by diffusion welding to a metal layer 93 as the substrate material. Then circular recesses 92 are filled with a lubricant 94.

Figure 10:
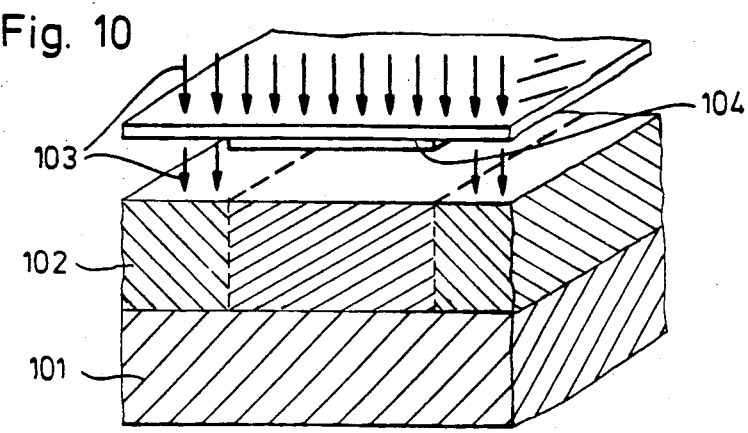
FIGS. 10 to 15 are perspective views of successive stages in the production of a third embodiment of a bearing material in which the supporting bearing surface is provided with dosaging slits with broader lubricant pockets disposed therebelow.
Figure 11:
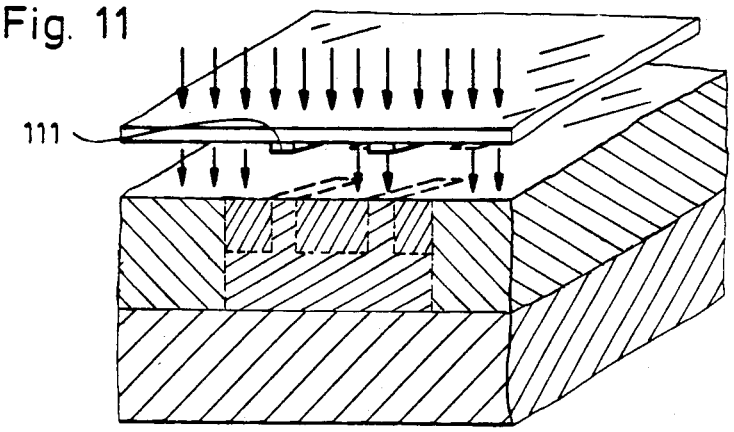
Figure 12:
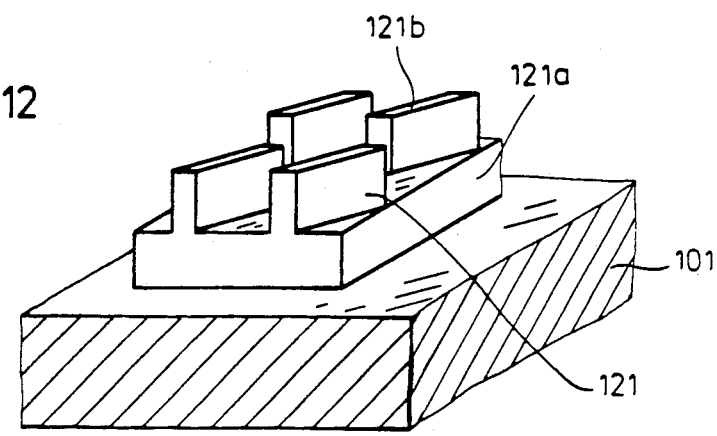
Figure 13:
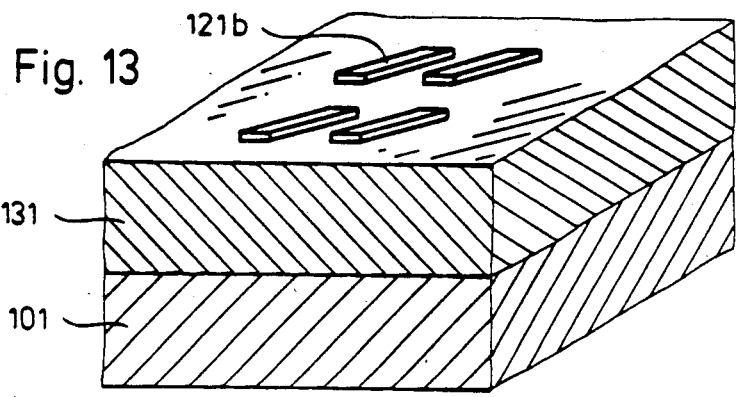

FIG. 10 shows a metal layer 101 to which has been applied a layer 102 of a material whose characteristics can be changed by X-ray radiation (resist material). By partial irradiation with synchrotron radiation 103 through an X-ray mask 104 and subsequent renewed irradiation, as shown in FIG. 11, through a second X-ray mask 111 with synchrotron radiation of a reduced penetration depth, partial removal of the resist material and utilization of the different material characteristics produced by the radiation results, as shown in FIG. 12, in a negative mold 121 composed of bases 121a with pins 121b of resist material disposed thereon. Then, as shown in FIG. 13, a metal layer 131 is electrolytically deposited on layer 101 serving as an electrode, so as to embed the bases and the pins.

Figure 14:
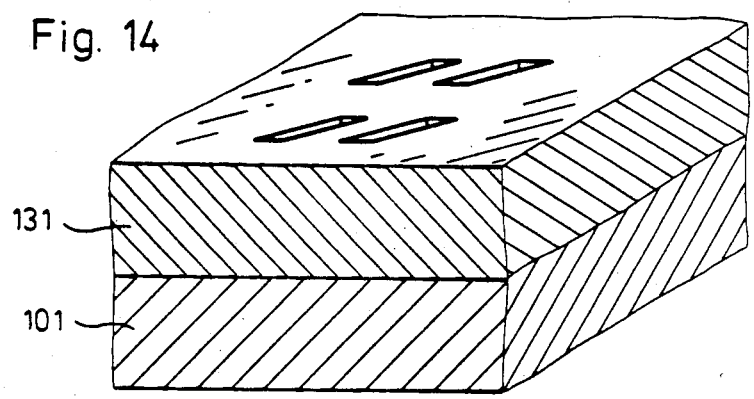
Figure 15:
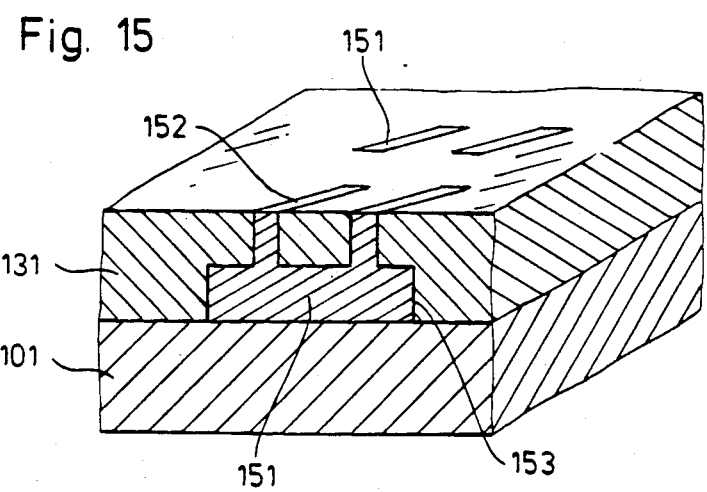

After the upper surface of metal layer 131 has been planed flat, pins 121b and bases 121a of negative mold 121 are removed, as shown in FIG. 14, and replaced by a lubricant 151 as shown in FIG. 15. The lubricant fills dosaging slits 152 as well as lubricant pockets 153 disposed therebelow, which pockets are wider than slits 152.

The embodiment including lubricant pockets 153 and dosaging slits 152 as shown in FIG. 15 can be combined with the embodiments according to FIGS. 6 and 9 in one and the same supporting layer 101 in the sense of optimizing lubrication and supporting capability of the bearing. In addition to the advantages of the bearing material described in connection with the embodiment of FIGS. 1–6, this combination, because of its large supply of lubricant, offers a longer service life for the bearing without subsequent lubrication and permits, by selection of the size of the dosaging slits and/or the use of gelled lubricating oils as lubricants, optimally dosaged lubricant discharge.

Figure 16:
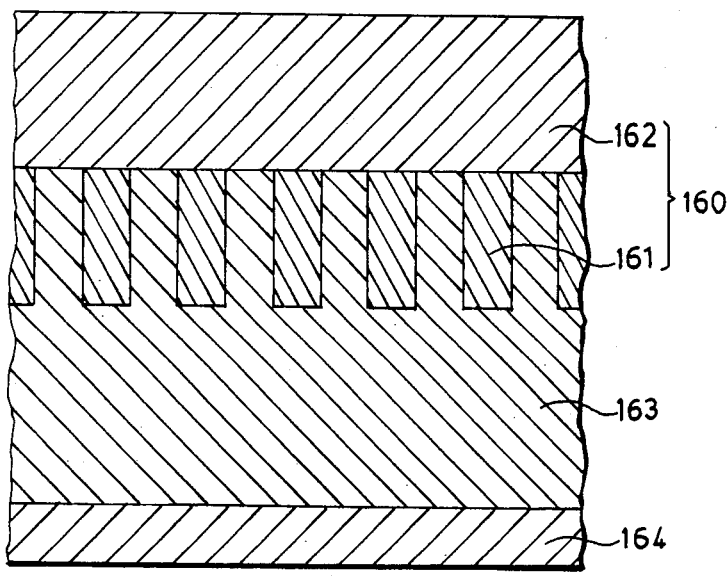
FIGS. 16 and 17 are cross-sectional elevational views of two stages in the production of a plastic bearing material with the aid of a metal molding tool produced by way of X-ray deep-etch lithography and galvanoplasty.

FIG. 16 is a cross-sectional view of a metal molding tool 160 produced by means of X-ray lithography and galvanoplasty and composed of microstructures 161 firmly connected to a conductive base plate 162. This tool is in engagement with a molding substance 163 combined with a layer of a releasing aid 164. The molding substance employed here may be any typical injection molding substance employed for plastic bearings or a casting resin. After solidification of molding substance 163, unmolding takes place, whereupon the releasing aid 164 is removed. After working the surface 170, shown in FIG. 17, a structure 171 of plastic results which is provided with recesses 172 that are to be filled with lubricant. If required, releasing aid 164 may also be left as the substrate material for the molding substance.

Figure 17:
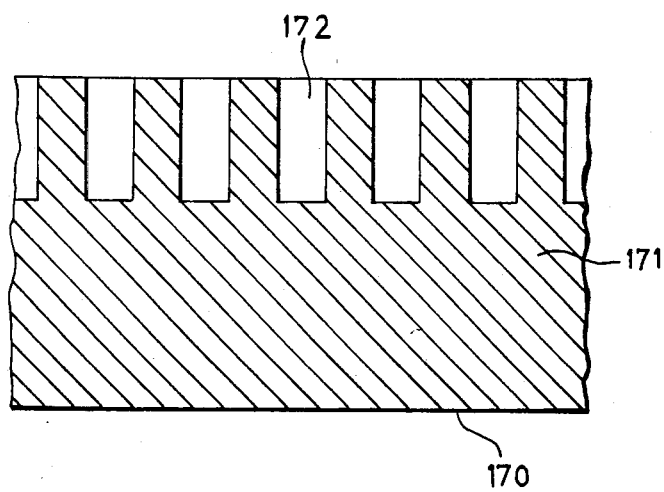

The embodiment according to FIG. 17 has the advantage, compared to conventional lubricated plastic bearings, that the surface can be lubricated in a precisely dosaged manner and thus the permissible sliding speeds can be increased. Moreover a special selective chemical or physical treatment of the surface may be applied in order to increase the service life of the bearing by improving the spreading behavior of the lubricant of the surface of the bearing.

In the above embodiments, the lubricant filled spaces have the shape of a network of hexagonal prisms, cylindrical bores or dosaging slits. Instead of or in addition to these shapes, it is of course also possible to provide different shaped spaces, e.g. spiral grooves.

The invention now being fully described, it will be apparent to one of ordinary skill in the art that many changes and modifications can be made thereto without departing from the spirit or scope of the invention as set forth herein.

What is claimed is:

1. Method of producing a plate-shaped bearing member for slide bearings, the structure being composed of a patterned body of supporting bearing material and a lubricant, utilizing a galvanoplastic fabrication step, said method comprising:

(a) producing a mold provided with a pattern of recesses, said step of producing including performing an X-ray deep-etch lithography procedure;
   (b) filling the recesses to form the body of bearing material;
   (c) removing the mold from the body of bearing material so that spaces are left in the bearing material; and
   (d) filling the thus produced spaces with the lubricant.

2. A method as defined in claim 1 wherein the mold recesses have a bottom forming an electrically conductive layer, and said step of filling the recesses is carried out electrolytically using the electrically conductive layer as an electrode.

3. Method as defined in claim 2 further comprising, after said step of removing and before said step of filling with the lubricant, connecting the layer of bearing material with a substrate body.

4. Method as defined in claim 2 wherein said step of producing a mold is carried out to form a mold structure composed of at least one base portion having a selected height and selected transverse dimensions and at least one further portion protruding from the base portion and having a selected height and selected transverse dimensions, with at least one transverse dimension of the further portion being less than the corresponding transverse dimension of the base portion, and with the total height of the mold structure being at least equal to the thickness of the resulting bearing material layer.

5. A method as defined in claim 1 wherein the material used to fill the recesses in said step of filling is a non-electrolytically depositable, moldable material.

6. A method as defined in claim 5 wherein the moldable material is a plastic, glass, or ceramic material.

7. A Method as defined in claim 1, wherein the step of producing a mold provides applying a molding tool said molding tool being produced by means of x-ray-deep-etch lithography and galvanoplasty.

* * * * *